United States Patent
Laurello et al.

(10) Patent No.: US 9,562,475 B2
(45) Date of Patent: Feb. 7, 2017

(54) VANE CARRIER TEMPERATURE CONTROL SYSTEM IN A GAS TURBINE ENGINE

(71) Applicant: SIEMENS AKTIENGESELLSCHAFT, München (DE)

(72) Inventors: Vincent P. Laurello, Hobe Sound, FL (US); Kok-Mun Tham, Oviedo, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 962 days.

(21) Appl. No.: 13/719,269

(22) Filed: Dec. 19, 2012

(65) Prior Publication Data
US 2014/0311157 A1    Oct. 23, 2014

(51) Int. Cl.
| | |
|---|---|
| F02C 6/08 | (2006.01) |
| F02C 6/04 | (2006.01) |
| F01D 5/18 | (2006.01) |
| F04D 29/40 | (2006.01) |
| F01D 25/08 | (2006.01) |
| F04D 29/58 | (2006.01) |
| F02C 7/18 | (2006.01) |

(52) U.S. Cl.
CPC .. F02C 7/18 (2013.01); F02C 6/08 (2013.01)

(58) Field of Classification Search
CPC ............ F01D 9/06; F01D 9/065; F01D 25/12; F02C 17/18; F02C 6/08
USPC ............ 60/782; 415/115–117, 175–177, 179
See application file for complete search history.

(56) References Cited

U.S. PATENT DOCUMENTS

| | | | |
|---|---|---|---|
| 3,528,250 A | 9/1970 | Johnson | |
| 4,137,705 A | 2/1979 | Andersen et al. | |
| 4,254,618 A | 3/1981 | Elovic | |
| 4,967,552 A * | 11/1990 | Kumata | F01D 5/08 |
| | | | 415/115 |
| 5,134,844 A * | 8/1992 | Lee et al. | 60/806 |
| 5,317,877 A | 6/1994 | Stuart | |

(Continued)

FOREIGN PATENT DOCUMENTS

| | | |
|---|---|---|
| CN | 1877101 A | 12/2006 |
| CN | 1971011 A | 5/2007 |

(Continued)

OTHER PUBLICATIONS

DE 102006010863 A1 English Translation.*

*Primary Examiner* — Thomas Denion
*Assistant Examiner* — Jessica Kebea

(57) ABSTRACT

A vane carrier temperature control system for use in a gas turbine engine includes a first cooling air source, a second cooling air source, and an air temperature control system. The first cooling air source supplies a first portion of vane carrier cooling air extracted from a compressor section of the engine to a first section of a vane carrier that supports a plurality of rows of vanes within a turbine section of the engine. The second cooling air source supplies a second portion of vane carrier cooling air extracted from the compressor section to a second section of the vane carrier spaced from the first section in an axial direction defined by a direction of hot working gas flow through the turbine section. The air temperature control system controls a temperature of at least one of the first and second portions of vane carrier cooling air.

15 Claims, 5 Drawing Sheets

(56) References Cited

U.S. PATENT DOCUMENTS

| | | |
|---|---|---|
| 5,392,614 A | 2/1995 | Coffinberry |
| 5,468,123 A | 11/1995 | Guimier et al. |
| 5,581,996 A | 12/1996 | Koch et al. |
| 6,487,863 B1 | 12/2002 | Chen et al. |
| 6,615,574 B1 * | 9/2003 | Marks ............... 60/772 |
| 6,968,696 B2 | 11/2005 | Little |
| 7,269,955 B2 | 9/2007 | Albers et al. |
| 7,708,518 B2 * | 5/2010 | Chehab ............... 415/115 |
| 8,015,826 B2 * | 9/2011 | Myers ............... F01K 13/02 60/782 |
| 8,033,116 B2 * | 10/2011 | Sengar et al. ............... 60/775 |
| 8,056,345 B2 * | 11/2011 | Norris ............... F02C 7/14 60/736 |
| 8,240,153 B2 * | 8/2012 | Childers et al. ............... 60/782 |
| 8,495,883 B2 * | 7/2013 | Foust et al. ............... 60/782 |
| 2003/0046938 A1 | 3/2003 | Mortzheim et al. |
| 2010/0175387 A1 | 7/2010 | Foust et al. |
| 2010/0251727 A1 | 10/2010 | Myers et al. |
| 2011/0016870 A1 * | 1/2011 | Kashler ............... F02C 6/18 60/772 |
| 2011/0135456 A1 * | 6/2011 | Takahashi et al. ............ 415/180 |
| 2011/0271689 A1 * | 11/2011 | Lacy ............... F01D 9/023 60/806 |
| 2013/0036747 A1 * | 2/2013 | Fuchs ............... F01D 5/187 60/782 |
| 2013/0283814 A1 * | 10/2013 | Johns et al. ............... 60/782 |
| 2014/0157791 A1 * | 6/2014 | Saha et al. ............... 60/785 |

FOREIGN PATENT DOCUMENTS

| | | |
|---|---|---|
| CN | 102112703 A | 6/2011 |
| DE | 102006010863 A1 * | 9/2006 |
| JP | S62182444 A | 8/1987 |
| JP | 11036889 A | 2/1999 |
| RU | 2107168 C1 | 3/1998 |
| WO | 2010084573 A1 | 7/2010 |

* cited by examiner

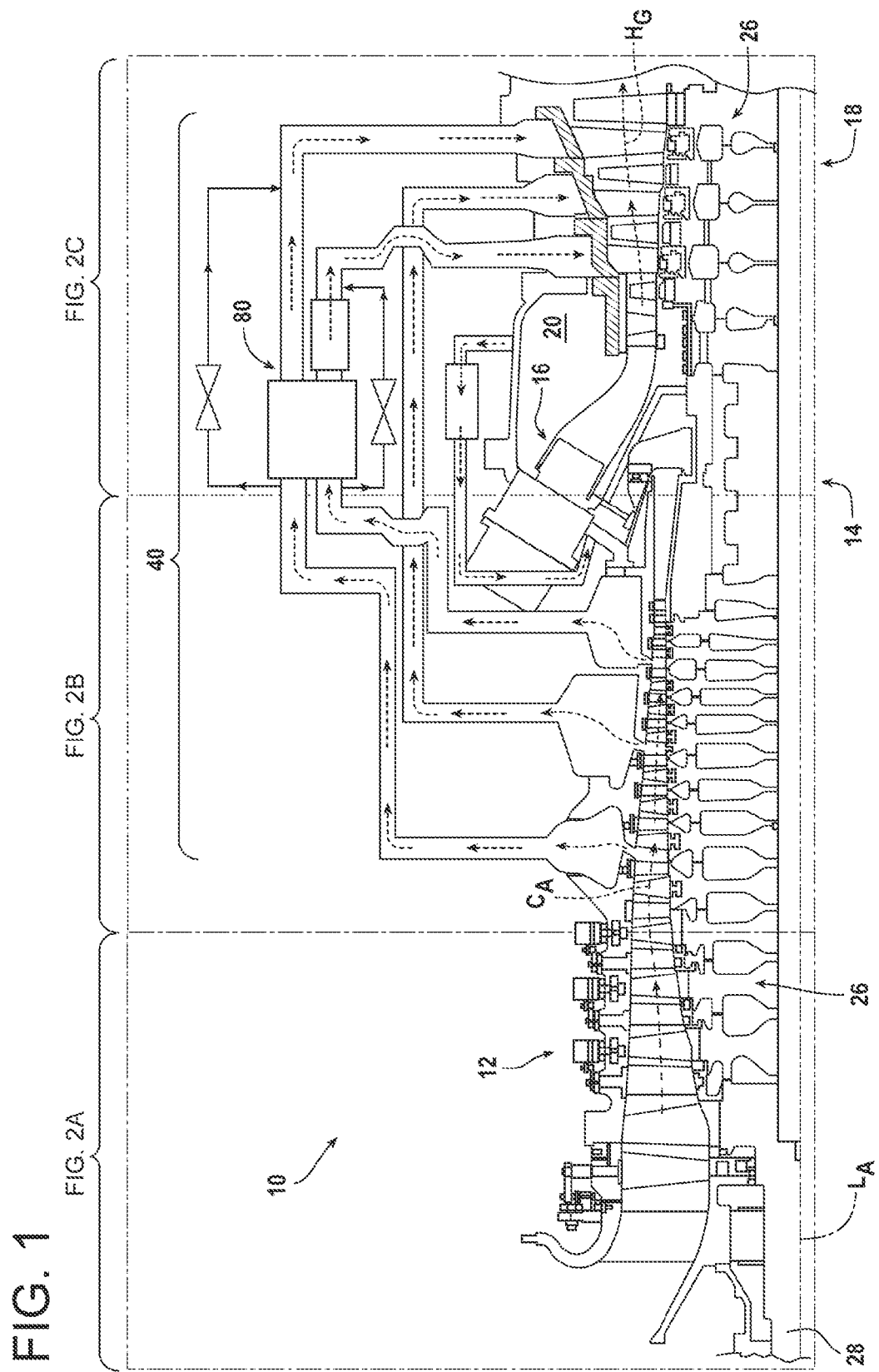

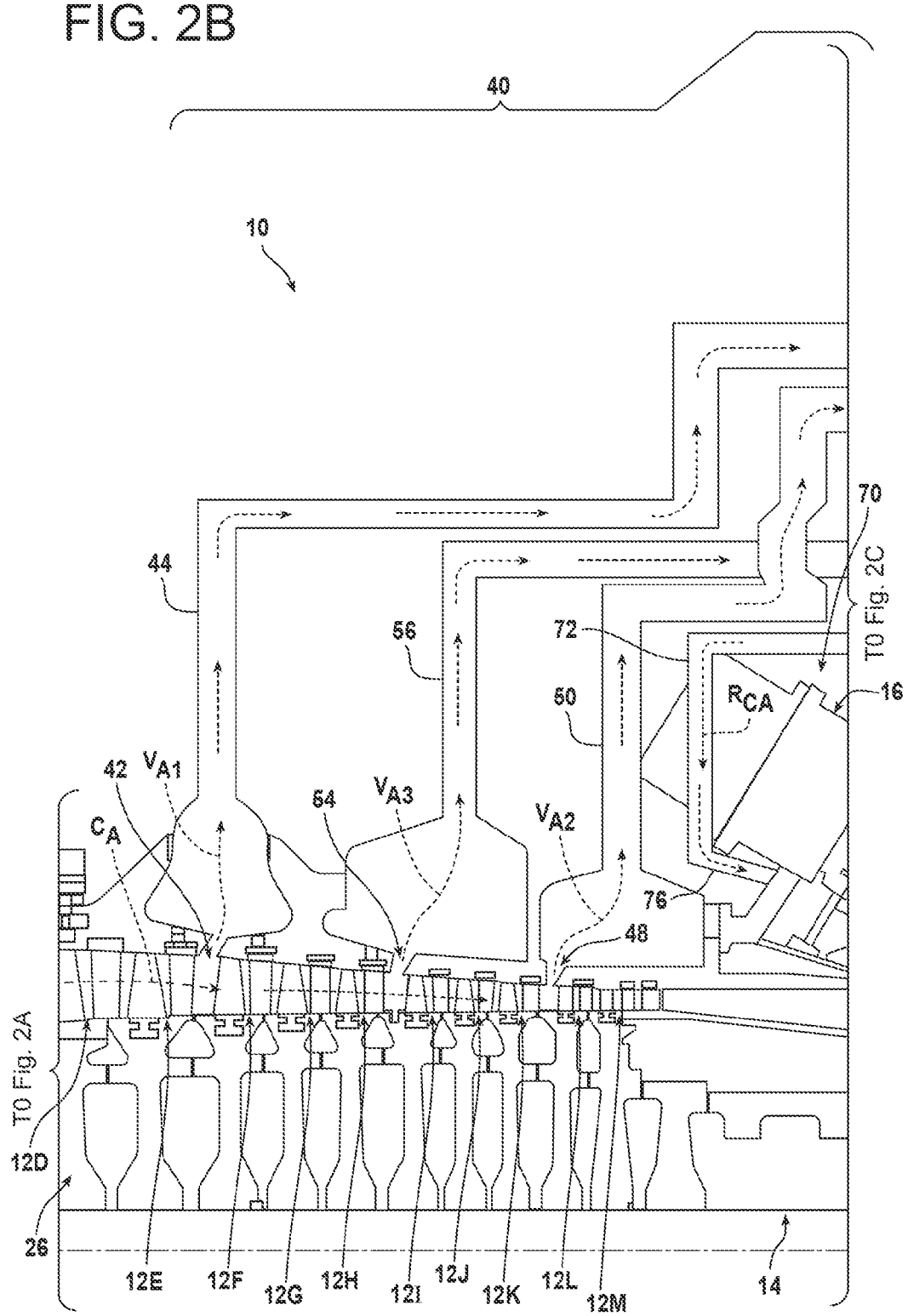

VANE CARRIER TEMPERATURE CONTROL SYSTEM IN A GAS TURBINE ENGINE

FIELD OF THE INVENTION

The present invention relates to a vane carrier temperature control system in a gas turbine engine, wherein the system controls the temperature of one or more portions of cooling air supplied to stages of a vane carrier in a turbine section of the engine.

BACKGROUND OF THE INVENTION

During operation of a gas turbine engine, air is pressurized in a compressor section then mixed with fuel and burned in a combustion section to generate hot combustion gases. One or more combustors in the combustion section supply the hot combustion gases to a turbine section of the engine where the hot combustion gases are expanded to extract energy therefrom to provide output power, which is in turn used to produce electricity. Due to the high operating temperatures within the engine, in particular in the combustors and in the turbine section, select engine components are cooled with a cooling fluid, such as, for example, air that is bled off from the compressor section.

SUMMARY OF THE INVENTION

In accordance with the present invention, a vane carrier temperature control system is provided in a gas turbine engine that includes a compressor section including a plurality of compressor stages, a combustion section, a turbine section including a plurality of turbine stages, and a rotatable rotor. The vane carrier temperature control system comprises a rotor cooling air source that supplies rotor cooling air to the rotor, a first vane carrier cooling air source, a second vane carrier cooling air source, and an air temperature control system. The first vane carrier cooling air source supplies a first portion of vane carrier cooling air extracted from the compressor section to a first section of a vane carrier, which supports a plurality of rows of vanes within the turbine section. The second vane carrier cooling air source supplies a second portion of vane carrier cooling air extracted from the compressor section to a second section of the vane carrier. The second section is spaced from the first section in an axial direction defined by a direction of hot working gas flow through the turbine section. The air temperature control system is provided for controlling a temperature of at least one of the first and second portions of vane carrier cooling air.

In accordance with a second aspect of the present invention, a vane carrier temperature control system is provided in a gas turbine engine that includes a compressor section including a plurality of compressor stages, a combustion section, a turbine section including a plurality of turbine stages, and a rotatable rotor. The vane carrier temperature control system comprises a rotor cooling air source that supplies rotor cooling air to the rotor, a first vane carrier cooling air source, a second vane carrier cooling air source, a third vane carrier cooling air source, and an air temperature control system. The first vane carrier cooling air source supplies a first portion of vane carrier cooling air extracted from an upstream section of the compressor section with respect to a direction of compressed air flow through the compressor section to a downstream section of a vane carrier with reference to an axial direction defined by a direction of hot working gas flow through the turbine section, wherein the vane carrier supports a plurality of rows of vanes within the turbine section. The second vane carrier cooling air source supplies a second portion of vane carrier cooling air extracted from a downstream section of the compressor section with reference to the direction of compressed air flow through the compressor section to an axially upstream section of the vane carrier. The third vane carrier cooling air source supplies a third portion of vane carrier cooling air extracted from an intermediate section of the compressor section with respect to the direction of compressed air flow through the compressor section to an axially intermediate section of the vane carrier. The air temperature control system includes a heat exchanger for controlling a temperature of the first, second, and/or third portions of vane carrier cooling air such that the temperature of the first, second, and/or third portions of vane carrier cooling air is within a predetermined temperature differential relative to a temperature of the rotor cooling air at a predetermined location.

In accordance with a third aspect of the present invention, a method is provided for operating a gas turbine engine that includes a compressor section including a plurality of compressor stages, a combustion section, a turbine section including a plurality of turbine stages, and a rotatable rotor. Rotor cooling air is provided to the rotor. A first portion of vane carrier cooling air extracted from an upstream section of the compressor section with reference to a direction of compressed air flow through the compressor section is supplied to a downstream section of a vane carrier with respect to an axial direction defined by a direction of hot working gas flow through the turbine section, wherein the vane carrier supporting a plurality of rows of vanes within the turbine section. A second portion of vane carrier cooling air extracted from a downstream section of the compressor section with respect to the direction of compressed air flow through the compressor section is supplied to an axially upstream section of the vane carrier. A temperature of at least one of the first and second portions of vane carrier cooling air is controlled such that the at least one of the first and second portions of vane carrier cooling air is within a predetermined temperature differential relative to a temperature of the rotor cooling air at a predetermined location.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 1 is a schematic diagram of a gas turbine engine including a vane carrier temperature control system according to an embodiment of the invention;

FIGS. 2A, 2B, and 2C are enlarged views of respective portions of FIG. 1; and

DETAILED DESCRIPTION OF THE INVENTION

Figure 2A:
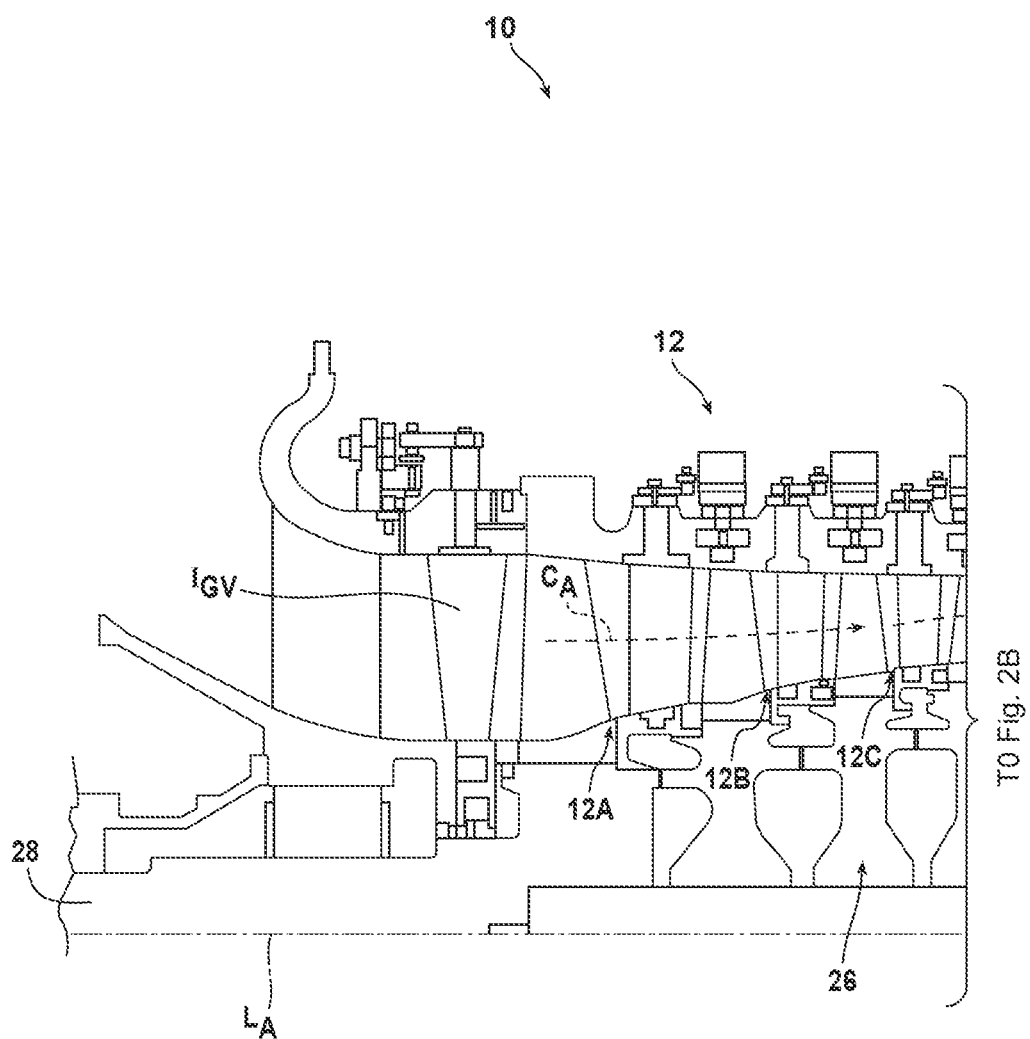

In the following detailed description of the preferred embodiments, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Referring to FIG. 1, a gas turbine engine 10 constructed in accordance with the present invention is shown. The engine 10 includes a compressor section 12, a combustion section 14 including a plurality of combustors 16 (only one combustor 16 is shown in FIG. 1), and a turbine section 18. It is noted that the engine 10 according to the present invention preferably comprises an annular array of combustors 16 that are disposed about a longitudinal axis $L_A$ of the engine 10 that defines an axial direction within the engine 10, wherein the axial direction defines a direction for compressed air $C_A$ flow through the compressor section 12 and also a direction of hot working gas $H_G$ flow through the turbine section 18. Such a configuration is typically referred to as a "can-annular combustion system."

The compressor section 12 inducts and pressurizes inlet air, at least a portion of which is directed to a combustor shell 20 for delivery to the combustors 16. Other portions of the pressurized air may be extracted from the compressor section 12 to cool various components within the engine 10, as will be discussed in detail below. In the exemplary engine configuration shown, the compressor section 12 includes thirteen stages 12A-12M, see FIGS. 2A and 2B. Each stage 12A-M includes a row of rotating compressor blades that are coupled to a turbine rotor 26, which extends parallel to a rotatable shaft 28 (see FIGS. 1 and 2A) that extends axially through the engine 10 along the longitudinal axis $L_A$, and a row of stationary vanes. The exemplary engine 10 illustrated in FIG. 1 also includes a row of inlet guide vanes $I_{GV}$ located axially forward from the first stage 12A, see FIG. 2A.

Upon entering the combustors 16, the compressed air from the compressor section 12 is mixed with fuel and ignited to produce high temperature combustion gases, also referred to herein as a hot working gas, flowing in a turbulent manner and at a high velocity within the respective combustor 16. The combustion gases in each combustor 16 then flow through a respective transition duct 30 to the turbine section 18 where the combustion gases are expanded to extract energy therefrom, see FIG. 2C. A portion of the energy extracted from the combustion gases is used to provide rotation of the turbine rotor 26, and, correspondingly, the rows of compressor blades.

Figure 2C:
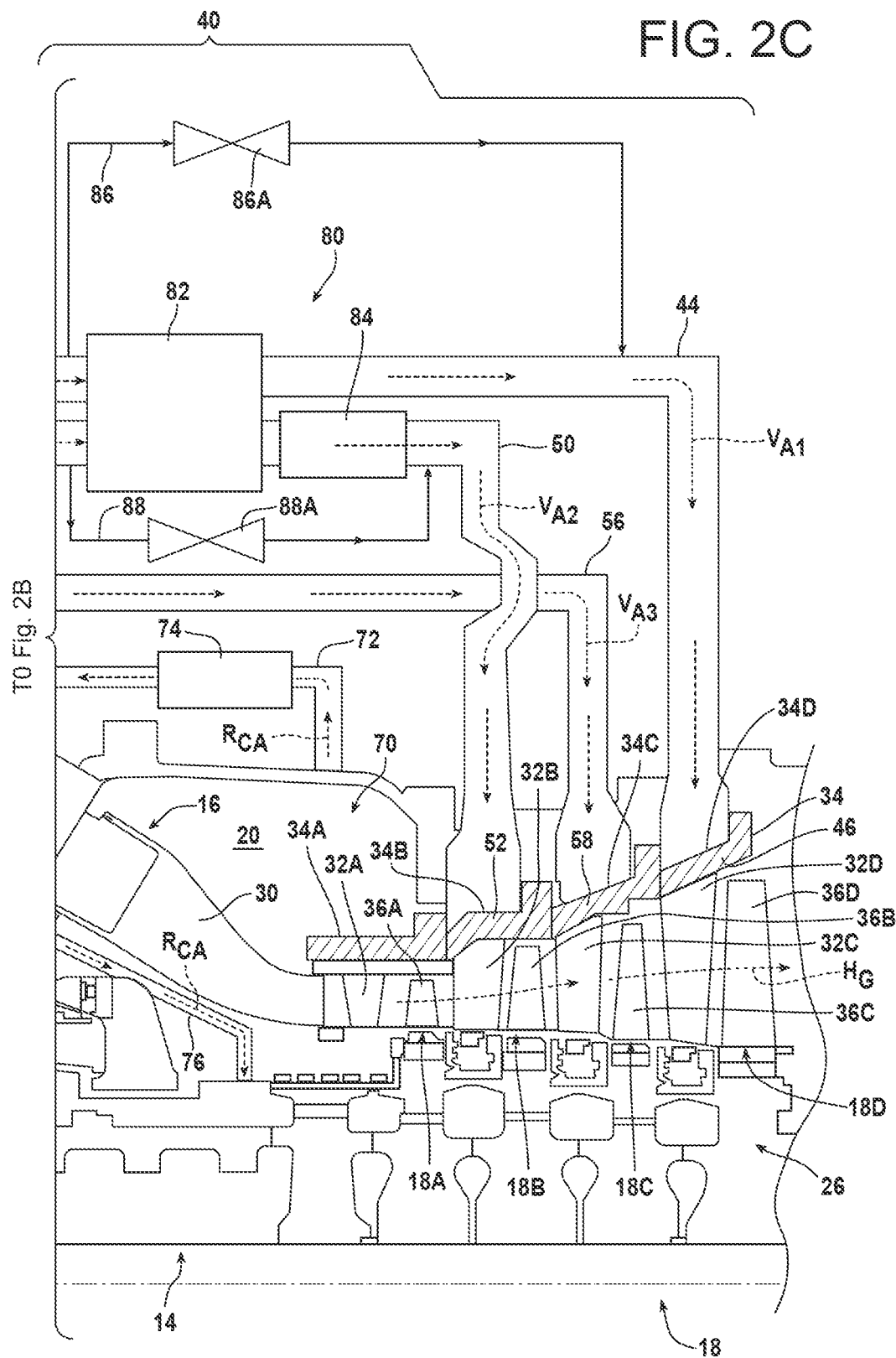

Referring to FIG. 2C, in the exemplary engine configuration shown, the turbine section 18 includes four stages 18A-D. Each stage 18A-D includes a row of stationary vanes 32A-D that are supported by a vane carrier 34 located radially outwardly from the vanes 32A-D, and a row of rotating blades 36A-D that are coupled to the turbine rotor 26. The vane carrier 34 may include a separate portion 34A-D for each row of vanes 32A-D as shown in FIG. 2C, or the vane carrier 34 may include fewer portions, wherein each portion would support at least one row of vanes 32A-D. Further, the portions 34A-D of the vane carrier 34 may comprise continuous cylindrical members or they may be formed from a plurality of circumferential segments with generally axially extending slots formed between adjacent segments.

A vane carrier temperature control system 40 that supplies cooling air to components within the engine 10 according to an aspect of the present invention will now be described.

As noted above, portions of the pressurized air from the compressor section 12 may be extracted to cool various components within the engine 10. For example, according to an aspect of the present invention and as will be described in greater detail below, a first portion of compressed air is extracted from an upstream section or stage or the compressor section 12, which comprises a first vane carrier cooling air source 42 of the vane carrier temperature control system 40 (see FIG. 2B), for being supplied to a downstream section of the vane carrier 34 corresponding to a downstream stage of the turbine section 18. A second portion of compressed air is extracted from a downstream section or stage or the compressor section 12, which comprises a second vane carrier cooling air source 48 of the vane carrier temperature control system 40 (see FIG. 2B), for being supplied to an upstream section of the vane carrier 34 corresponding to an upstream stage of the turbine section 18. A third portion of compressed air is extracted from an intermediate section or stage or the compressor section 12, which comprises a third vane carrier cooling air source 54 of the vane carrier temperature control system 40 (see FIG. 2B), for being supplied to an intermediate section of the vane carrier 34 corresponding to an intermediate stage of the turbine section 18.

Specifically, in the embodiment shown, the first portion of extracted compressed air comprises a first portion of vane carrier cooling air $V_{A1}$ that is extracted from the fifth compressor stage 12E (see FIG. 2B), which comprises the first vane carrier cooling air source 42. The first portion of vane carrier cooling air $V_{A1}$ is supplied via a first piping system 44 to a first section 46 of the vane carrier 34 corresponding to the fourth turbine stage 18D and the fourth vane carrier portion 34D in the embodiment shown (see FIG. 2C).

The second portion of extracted compressed air comprises a second portion of vane carrier cooling air $V_{A2}$ that is extracted from the eleventh compressor stage 12K (see FIG. 2B), which comprises the second vane carrier cooling air source 48 and is spaced from the fifth compressor stage 12E in the direction of compressed air $C_A$ flow through the compressor section 12. The second portion of vane carrier cooling air $V_{A2}$ is supplied via a second piping system 50 to a second section 52 of the vane carrier 34 corresponding to the second turbine stage 18B and the second vane carrier portion 34B in the embodiment shown (see FIG. 2C). The second turbine stage 18B is spaced from the fourth turbine stage 18D in the axial direction, which is defined by the direction of hot working gas $H_G$ flow through the turbine section 18.

The third portion of extracted compressed air comprises a third portion of vane carrier cooling air $V_{A3}$ that is extracted from the eighth compressor stage 12H (see FIG. 2B), which comprises the third vane carrier cooling air source 54 and is spaced from the fifth and eleventh compressor stages 12E, 12K in the direction of compressed air $C_A$ flow through the compressor section 12. The third portion of vane carrier cooling air $V_{A3}$ is supplied via a third piping system 56 to a third section 58 of the vane carrier 34 corresponding to the third turbine stage 18C and the third vane carrier portion 34C in the embodiment shown (see FIG. 2C). The third turbine stage 18C is spaced from the second and fourth turbine stages 18B, 18D in the axial direction. It is noted that the compressor and turbine stages associated with the respective portions of vane carrier cooling air $V_{A1-3}$ discussed herein are exemplary and these portions of vane carrier cooling air $V_{A1-3}$ could be associated with any suitable compressor and/or turbine stages.

As shown in FIGS. 2B and 2C, the vane carrier temperature control system 40 further comprises a rotor cooling air source 70 that supplies rotor cooling air $R_{CA}$ to the rotor 26. In the embodiment shown, the rotor cooling air source 70 comprises the combustor shell 20, wherein a portion of the compressed air in the combustor shell 20 is extracted by a fourth piping system 72 and cooled in an external cooler 74, see FIG. 2C. The rotor cooling air $R_{CA}$ is then supplied to the rotor 26 via any conventional method, which, in the embodiment shown in FIG. 1, comprises a plurality rotor cooling air pipes 76 (only one rotor cooling pipe 76 is shown in FIGS. 1, 2B, and 2C) that are in communication with the fourth piping system 72.

Referring to FIG. 2C, the vane carrier temperature control system 40 according to the present embodiment also comprises an air temperature control system 80 comprising a heat exchanger 82 for controlling a temperature of at least one of the portions of vane carrier cooling air $V_{A1-3}$. In the embodiment shown, the heat exchanger 82 controls the temperature of the first and second portions of vane carrier cooling air $V_{A1}$, $V_{A2}$. Specifically, the heat exchanger 82 according to this embodiment uses the first portion of vane carrier cooling air $V_{A1}$ as a coolant to cool the second portion of vane carrier cooling air $V_{A2}$. The first portion of vane carrier cooling air $V_{A1}$ is able to be used as a coolant in the heat exchanger 82 to cool the second portion of vane carrier cooling air $V_{A2}$, as the first portion of vane carrier cooling air $V_{A1}$, being extracted from an upstream section of the compressor section 12, i.e., the fifth compressor stage 12E in the embodiment shown, is cooler than the second portion of vane carrier cooling air $V_{A2}$, which is extracted from a downstream section of the compressor section 12, i.e., the eleventh compressor stage 12K in the embodiment shown, i.e., the compressed air is heated as it travels in the direction of compressed air $C_A$ flow and is compressed in the compressor section 12, as will be readily apparent to those having ordinary skill in the art, which accounts for the temperature differential between the first and second portions of vane carrier cooling air $V_{A1}$, $V_{A2}$ at their respective extraction locations.

While the first portion of vane carrier cooling air $V_{A1}$ is used as a coolant in the heat exchanger 82 to cool the second portion of vane carrier cooling air $V_{A2}$, other configurations could be implemented. For example, the first portion of vane carrier cooling air $V_{A1}$ could be used as a coolant in a heat exchanger to cool the third portion of vane carrier cooling air $V_{A3}$, and/or the third portion of vane carrier cooling air $V_{A3}$ could be used as a coolant in a heat exchanger to cool the second portion of vane carrier cooling air $V_{A2}$.

Additionally, the air temperature control system 80 illustrated in FIG. 2C includes an optional secondary cooler 84 that provides additional cooling to the second portion of vane carrier cooling air $V_{A2}$. The secondary cooler 84 may be required to cool the second portion of vane carrier cooling air $V_{A2}$ to a desired temperature if the first portion of vane carrier cooling air $V_{A1}$ does not have the capacity to cool the second portion of vane carrier cooling air $V_{A2}$ all the way down to the desired temperature without the first portion of vane carrier cooling air $V_{A1}$ being heated above a preferred temperature. The secondary cooler 84 may use, for example, ambient air, mist, steam, water, or fuel that is to be supplied to the combustors 16 as a coolant to cool the second portion of vane carrier cooling air $V_{A2}$.

The primary function of the air temperature control system 80 according to this embodiment of the invention is to control the temperatures of the first and second portions of vane carrier cooling air $V_{A1}$, $V_{A2}$ such that each is within a predetermined temperature differential, for example, within about 25° C., to a temperature of the rotor cooling air $R_{CA}$ at a predetermined location. It is noted that the extraction location of the third portion of vane carrier cooling air $V_{A3}$ according to this embodiment is preferably selected such that the third portion of vane carrier cooling air $V_{A3}$ is within the predetermined temperature differential relative to the temperature of the rotor cooling air $R_{CA}$ as it is extracted, such that the air temperature control system 80 is not required to heat or cool the third portion of vane carrier cooling air $V_{A3}$. It is noted that the temperatures of the portions of vane carrier cooling air $V_{A1-3}$ are preferably lower than the temperature of the rotor cooling air $R_{CA}$.

In one embodiment, the temperatures of the portions of vane carrier cooling air $V_{A1-3}$ are controlled or extracted such that each is within a predetermined temperature differential relative to the temperature of the rotor cooling air $R_{CA}$ as the rotor cooling air $R_{CA}$ is introduced into the portion of the rotor 26 located in the turbine section 18, i.e., the predetermined location according to such an embodiment is the location where the rotor cooling air $R_{CA}$ is introduced into the portion of the rotor 26 located in the turbine section 18.

In another embodiment, the temperatures of the portions of vane carrier cooling air $V_{A1-3}$ are controlled or extracted such that each is within a predetermined temperature differential relative to the temperature of the rotor cooling air $R_{CA}$ at axial locations corresponding to where the respective portions of vane carrier cooling air $V_{A1-3}$ are supplied to the vane carrier 34, i.e., the predetermined location according to such an embodiment is the axial location corresponding to where the respective portion of vane carrier cooling air $V_{A1-3}$ is supplied to the vane carrier 34. That is, as the rotor cooling air $R_{CA}$ is introduced into the rotor 26 and as it travels axially downstream through the rotor 26, the rotor cooling air $R_{CA}$ is heated as a result of providing cooling to the rotor 26 and also by work that the rotor 26 performs to bring the rotor cooling air $R_{CA}$ to the rotational speed of the rotor 26. Hence, by the time the rotor cooling air $R_{CA}$ reaches the axial location corresponding to where the second portion of vane carrier cooling air $V_{A2}$ is introduced into the vane carrier 34, i.e., at the second turbine stage 18B in the embodiment shown, the temperature of the rotor cooling air $R_{CA}$ is higher than when it was introduced into the rotor 26. Similarly, by the time the rotor cooling air $R_{CA}$ reaches the axial location corresponding to where the third portion of vane carrier cooling air $V_{A3}$ is introduced into the vane carrier 34, i.e., at the third turbine stage 18C in the embodiment shown, the temperature of the rotor cooling air $R_{CA}$ is even higher than when it reached the second turbine stage 18B. Likewise, by the time the rotor cooling air $R_{CA}$ reaches the axial location corresponding to where the first portion of vane carrier cooling air $V_{A1}$ is introduced into the vane carrier 34, i.e., at the fourth turbine stage 18D in the embodiment shown, the temperature of the rotor cooling air $R_{CA}$ is even higher than when it reached the third turbine stage 18C. The air temperature control system 80 and the extraction location for the third portion of vane carrier cooling air $V_{A3}$ according to this embodiment are thus configured such that the temperatures of each of the portions of vane carrier cooling air $V_{A1-3}$ are within a predetermined temperature differential relative to the temperature of the rotor cooling air $R_{CA}$ at the axial locations corresponding to where the respective portions of vane carrier cooling air $V_{A1-3}$ are supplied to the vane carrier 34. Exemplary temperatures according to an aspect of the invention will be described below.

As shown in FIG. 2C, the vane carrier temperature control system 40 further comprises a pair of bypass circuits 86, 88 that are branched off from the respective first and second piping systems 44, 50. The bypass circuits 86, 88 include respective valves 86A, 88A for selectively allowing the first and second portions of vane carrier cooling air $V_{A1}$, $V_{A2}$ to bypass the heat exchanger 82. The valves 86A, 88A may be opened to allow the first and second portions of vane carrier cooling air $V_{A1}$, $V_{A2}$ to bypass the heat exchanger 82 and the secondary cooler 84 under certain operating conditions where it is not necessary or desirable to heat the first portion of vane carrier cooling air $V_{A1}$ and/or to cool the second portion of vane carrier cooling air $V_{A2}$. For example, it may not be necessary or desirable to heat the first portion of vane carrier cooling air $V_{A1}$ and/or to cool the second portion of vane carrier cooling air $V_{A2}$ during less than full load operation, otherwise known as base load operation, and especially during a start-up operation, of the engine 10. For example, during a start-up operation, it may be desirable to supply the second portion of vane carrier cooling air $V_{A2}$ to the second section 52 of the vane carrier 34 at a higher temperature to allow the vane carrier 34 to thermally grow away from tips of the turbine blades 36A-D in the turbine section 18 to avoid rubbing of the turbine blade tips against ring segments located radially outwardly from the turbine blades 36A-D.

A method for operating the engine 10 according to this embodiment of the invention will now be described. During a first operating mode, which may comprise full load or base load operation, the first, second, and third portions of vane carrier cooling air $V_{A1-3}$ are extracted from the first, second, and third cooling air sources 42, 48, 54, which respectively comprise the fifth, eleventh, and eighth compressor stages 12E, 12K, 12H according to this exemplary implementation of the invention as noted above. Exemplary extraction temperatures of the first, second, and third portions of vane carrier cooling air $V_{A1-3}$ are about 195° C., 370° C., and 285° C., respectively, although these temperatures could vary from engine to engine and may be dependent upon the operating mode of the engine 10. Further, the compressor stages that are selected as the respective cooling air sources 42, 48, 54 may vary, for example, depending upon the temperature of the rotor cooling air $R_{CA}$ and/or depending on the desired temperatures of the respective portions of vane carrier cooling air $V_{A1-3}$.

The portions of vane carrier cooling air $V_{A1-3}$ are conveyed through their respective piping systems 44, 50, 56 toward the turbine section 18 of the engine 10. According to this embodiment of the invention, during the first operating mode, the valves 86A, 88A of the bypass circuits 86, 88 are closed, such that the first and second portions of vane carrier cooling air $V_{A1}$, $V_{A2}$ pass through the heat exchanger 82 and the second and the second portion of vane carrier cooling air $V_{A2}$ passes through the secondary cooler 84 of the air temperature control system 80.

Once the first and second portions of vane carrier cooling air $V_{A1}$, $V_{A2}$ pass through the air temperature control system 80, the temperatures of each of the portions of vane carrier cooling air $V_{A1-3}$ are preferably within about 25° C. of the temperature of the rotor cooling air $R_{CA}$, either as the rotor cooling air $R_{CA}$ enters the portion of the rotor 26 located in the turbine section 18, wherein the rotor cooling air $R_{CA}$ temperature may be about 310° C. according to one exemplary aspect of the invention, or at axial locations corresponding to where the respective portions of vane carrier cooling air $V_{A1-3}$ are introduced to the vane carrier 34 as discussed above, wherein the rotor cooling air $R_{CA}$ temperature may be slightly greater than about 310° C. at the second turbine stage 18B, slightly greater at the third turbine stage 180 than it was at the second turbine stage 18B, and slightly greater at the fourth turbine stage 18D than it was at the third turbine stage 180. For example, the rotor cooling air $R_{CA}$ temperature may be about 320-330° C. at the second turbine stage 18B, about 330-340° C. at the third turbine stage 18C, and about 340-350° C. at the fourth turbine stage 18D, although these ranges are exemplary and could overlap or vary more greatly than as described. As noted above, the extraction location of the third portion of vane carrier cooling air $V_{A3}$ according to this embodiment is preferably selected such that the third portion of vane carrier cooling air $V_{A3}$ is within about 25° C. of the temperature of the rotor cooling air $R_{CA}$ as it is extracted, such that the air temperature control system 80 is not required to heat or cool the third portion of vane carrier cooling air $V_{A3}$.

The first, second, and third portions of vane carrier cooling air $V_{A1-3}$ are then supplied to their respective sections of the vane carrier 34. In the exemplary embodiment shown, the first portion of vane carrier cooling air $V_{A1}$ is supplied to the first section 46 of the vane carrier 34 corresponding to the fourth turbine stage 18D and the fourth vane carrier portion 34D, the second portion of vane carrier cooling air $V_{A2}$ is supplied to the second section 52 of the vane carrier 34 corresponding to the second turbine stage 18B and the second portion of the vane carrier 34B, and the third portion of vane carrier cooling air $V_{A3}$ is supplied to the third section 58 of the vane carrier 34 corresponding to the third turbine stage 180 and the third portion of the vane carrier 340.

During a second operating mode of the engine 10, which may comprise less than full load operation, such as during a start-up operation, the valves 86A, 88A of the bypass circuits 86, 88 are open, such that a majority of the first and second portions of vane carrier cooling air $V_{A1}$, $V_{A2}$ bypass the heat exchanger 82 and the secondary cooler 84 of the air temperature control system 80, i.e., as there is less flow restriction for the first and second portions of vane carrier cooling air $V_{A1}$, $V_{A2}$ to pass through the valves 86A, 88A than to flow through the heat exchanger 82, although some of the first and second portions of vane carrier cooling air $V_{A1}$, $V_{A2}$ may pass through the heat exchanger 82. Under these conditions, the first, second, and third portions of vane carrier cooling air $V_{A1-3}$ are supplied to their respective sections 46, 52, 58 of the vane carrier 34 substantially at their respective extraction temperatures.

The cooling of the sections 46, 52, 58 of the vane carrier 34 by the respective portions of vane carrier cooling air $V_{A1-3}$, which have temperatures that are a close thermal match to the temperature of the rotor cooling air $R_{CA}$, is believed to effect more uniform amounts of thermal growth undergone by the respective sections 46, 52, 58 of the vane carrier 34 and the rotor 26, i.e., as opposed to configurations wherein the temperatures of cooling air portions that are supplied to these respective components are not controlled. The more uniform amounts of thermal growth undergone by the respective sections 46, 52, 58 of the vane carrier 34 and the rotor 26 are believed to reduce or prevent issues that might otherwise result from these components thermally growing at different rates, such as distortion of the casing that surrounds the engine 10, and/or rubbing of the tips of the turbine blades 36A-D in the turbine section 18 against the ring segments located radially outwardly from the turbine blades 36A-D, thus lengthening a lifespan of these components and maintaining a tight blade tip clearance during full load operation for improved engine efficiency. The reduction/prevention of rubbing of the tips of the turbine blades 36A-D on the ring segments also reduces/prevents tip oxidation due to overheating, as rubbing of these components could otherwise block off cooling holes formed in the tips of the turbine blades 36A-D.

It is noted that, according to one aspect of the present invention, the sections of the vane carrier 34 associated with the first and second turbine stages 18A, 18B may be coupled together or otherwise associated with one another such that they are structurally tied to one another, wherein the second portion of vane carrier cooling air $V_{A2}$ delivered to the second section 52 of the vane carrier 34 would also have an impact on the section of the vane carrier 34 associated with the first turbine stage 18A and the first portion of the vane carrier 34A. Moreover, the section of the vane carrier 34 associated with the first turbine stage 18A and the first portion of the vane carrier 34A may be slotted such that it does not thermally expand and contract like a ring. Further, cooling air extracted form the compressor section 12 may be supplied to the section of the vane carrier 34 associated with the first turbine stage 18A and the first portion of the vane carrier 34A, e.g., from the thirteen compressor stage 12M.

Additionally, while three portions of vane carrier cooling air $V_{A1-3}$ are extracted from the compressor section 12 and supplied to the vane carrier 34 in the embodiment shown, additional or fewer portions of vane carrier cooling air could be extracted from the compressor section 12 and supplied to the vane carrier 34 without departing from the spirit and scope of the invention. For example, only two portions of vane carrier cooling air could be extracted from the compressor section 12 and supplied to the vane carrier 34, wherein the air temperature control system 80 could be used to control at least one of the portions of vane carrier cooling air such that it is a close thermal match to the temperature of the rotor cooling air $R_{CA}$ as described herein. In such an exemplary arrangement, one of the portions of vane carrier cooling air may be used in a heat exchanger to cool the other portion, and/or other suitable external cooling sources may be used, as will be discussed in further detail below.

Figure 3:
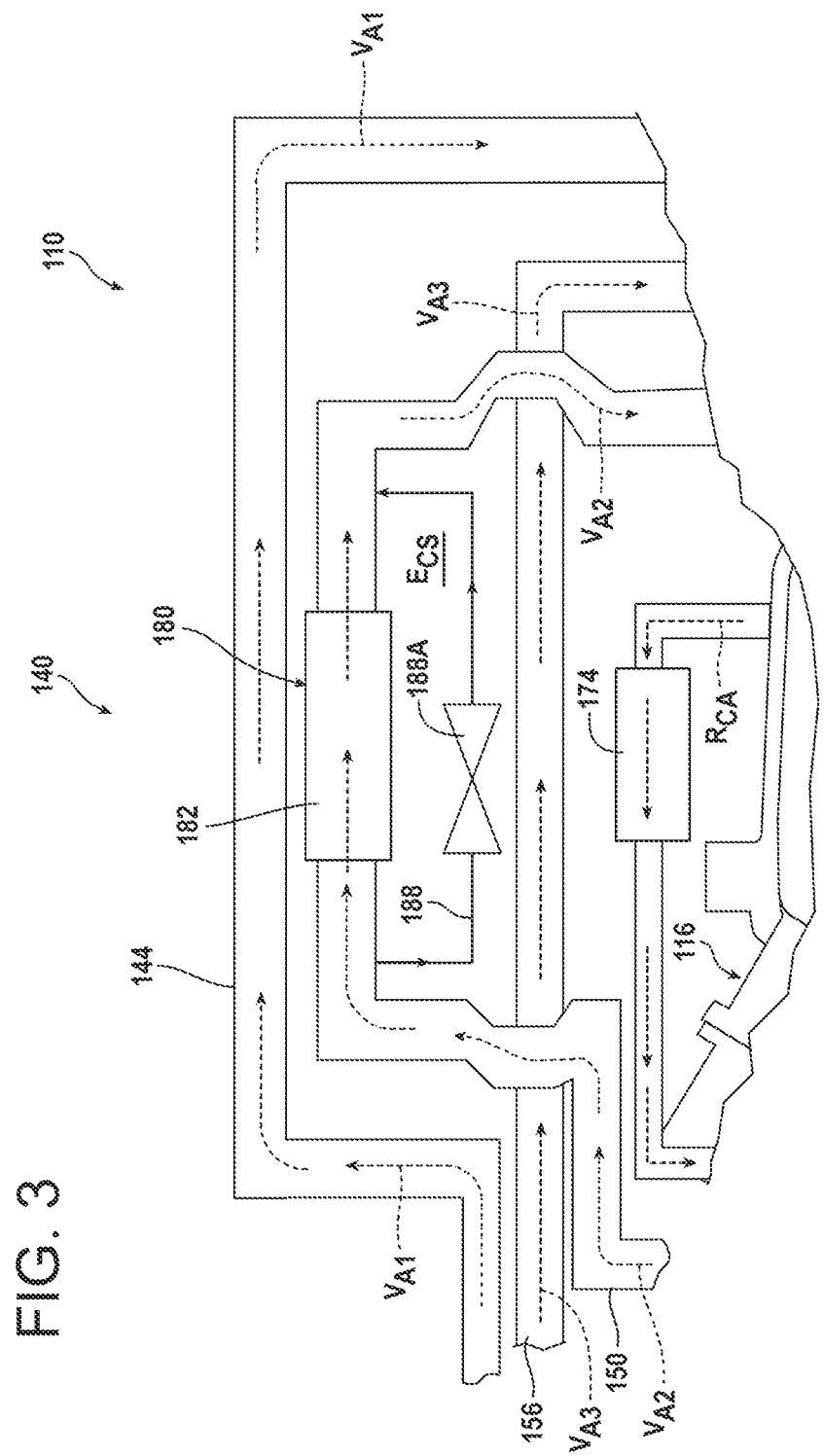
FIG. 3 is a schematic diagram of a vane carrier temperature control system for use in a gas turbine engine according to another embodiment of the invention.

Referring to FIG. 3, a vane carrier temperature control system 140 according to another embodiment of the invention is shown, where structure similar to that described above with reference to FIGS. 1 and 2A-C includes the same reference numeral increased by 100. Only structure that is different than as described above for FIGS. 1 and 2A-C will be specifically discussed herein with reference to FIG. 3. It is noted that portions of the engine 110 according to this embodiment that remain unchanged from the embodiment of FIGS. 1 and 2A-C have been removed for clarity.

In the embodiment illustrated in FIG. 3, rather than using the first portion of vane carrier cooling air $V_{A1}$ as a coolant in the heat exchanger 182 to cool the second portion of vane carrier cooling air $V_{A2}$, the heat exchanger 182 of the air temperature control system 180 according to this embodiment uses an external cooling source $E_{CS}$ as a coolant to cool the second portion of vane carrier cooling air $V_{A2}$. The external cooling source $E_{CS}$ in the embodiment shown in FIG. 3 uses ambient air as a coolant to cool the second portion of vane carrier cooling air $V_{A2}$, although other suitable fluids could be used, such as, for example, mist, steam, water, or fuel that is to be supplied to the combustors 116. Alternatively, the external cooler 174 that cools the rotor cooling air $R_{CA}$ may also function as the external cooling source $E_{CS}$ to cool the second portion of vane carrier cooling air $V_{A2}$.

As shown in FIG. 3, the vane carrier temperature control system 140 according to this embodiment includes a bypass circuit 188 including a valve 188A for selectively allowing the second portion of vane carrier cooling air $V_{A2}$ to bypass the heat exchanger 182. The valve 188A may be opened to allow a majority of the second portion of vane carrier cooling air $V_{A2}$ to bypass the heat exchanger 182 under certain operating conditions where it is not necessary or desirable to cool the second portion of vane carrier cooling air $V_{A2}$. For example, it may not be necessary or desirable to cool the second portion of vane carrier cooling air $V_{A2}$ during less than full load operation of the engine 110, e.g., during a start-up operation, as discussed above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A vane carrier temperature control system in a gas turbine engine that includes a compressor section including a plurality of compressor stages, a combustion section, a turbine section including a plurality of turbine stages, and a rotatable rotor, the vane carrier temperature control system comprising:
   a rotor cooling air source that supplies rotor cooling air to the rotor;
   a first vane carrier cooling air source that supplies a first portion of vane carrier cooling air extracted from the compressor section to a first section of a vane carrier, the vane carrier supporting a plurality of rows of vanes within the turbine section;
   a second vane carrier cooling air source that supplies a second portion of vane carrier cooling air extracted from the compressor section to a second section of the vane carrier, the second section being spaced from the first section in an axial direction defined by a direction of hot working gas flow through the turbine section; and
   an air temperature control system for controlling a temperature of at least one of the first and second portions of vane carrier cooling air, the air temperature control system comprising:
      a heat exchanger assembly having a first heat exchanger and a secondary cooler wherein fuel that is to be supplied to combustors in the combustion section is used as a coolant to cool the second portion of vane carrier cooling air within the secondary cooler;
   wherein the first heat exchanger is upstream from the secondary cooler and the first portion of vane carrier cooling air is used as a coolant to cool the second portion of vane carrier cooling air within the first heat exchanger prior to the second portion of vane carrier cooling air entering the secondary cooler; and
   the secondary cooler is used to cool the second portion of vane carrier cooling air to a desired temperature if the first portion of vane carrier cooling air does not have the capacity to cool the second portion of vane carrier cooling air in the first heat exchanger all the way down to the desired temperature without the first portion of vane carrier cooling air being heated above a preferred temperature.

2. The vane carrier temperature control system of claim 1, wherein the first portion of vane carrier cooling air is extracted from a first section of the compressor section and the second portion of vane carrier cooling air is extracted from a second section of the compressor section that is spaced from the first section of the compressor section in a direction of compressed air flow through the compressor section.

3. The vane carrier temperature control system of claim 2, wherein:
the first portion of vane carrier cooling air is extracted from an upstream stage of the compressor section and the second portion of vane carrier cooling air is extracted from a downstream stage of the compressor section with reference to the direction of compressed air flow through the compressor section; and
the first portion of vane carrier cooling air is supplied to an axially downstream stage of the turbine section and the second portion of vane carrier cooling air is supplied to an axially upstream stage of the turbine section.

4. The vane carrier temperature control system of claim 1, further comprising a pair of bypass circuits including respective valves for selectively allowing the first and second portions of vane carrier cooling air to bypass the first heat exchanger.

5. The vane carrier temperature control system of claim 1, wherein the first heat exchanger is configured such that the temperatures of the first and second portions of vane carrier cooling air are each within about 25° C. of a temperature of the rotor cooling air at axial locations corresponding to where the respective portions of vane carrier cooling air are supplied to the vane carrier.

6. The vane carrier temperature control system of claim 1, further comprising a bypass circuit including a valve for selectively allowing the second portion of vane carrier cooling air to bypass the heat exchanger.

7. A vane carrier temperature control system in a gas turbine engine that includes a compressor section including a plurality of compressor stages, a combustion section, a turbine section including a plurality of turbine stages, and a rotatable rotor, the vane carrier temperature control system comprising:
a rotor cooling air source that supplies rotor cooling air to the rotor;
a first vane carrier cooling air source that supplies a first portion of vane carrier cooling air extracted from an upstream section of the compressor section with respect to a direction of compressed air flow through the compressor section to a downstream section of a vane carrier with reference to an axial direction defined by a direction of hot working gas flow through the turbine section, the vane carrier supporting a plurality of rows of vanes within the turbine section;
a second vane carrier cooling air source that supplies a second portion of vane carrier cooling air extracted from a downstream section of the compressor section with reference to the direction of compressed air flow through the compressor section to an axially upstream section of the vane carrier;
a third vane carrier cooling air source that supplies a third portion of vane carrier cooling air extracted from an intermediate section of the compressor section with respect to the direction of compressed air flow through the compressor section to an axially intermediate section of the vane carrier; and
an air temperature control system including a heat exchanger assembly having a first heat exchanger and a secondary cooler for controlling a temperature of the second portion of vane carrier cooling air, the secondary cooler using fuel that is to be supplied to combustors in the combustion section as a coolant such that the temperature of the second portion of vane carrier cooling air is within a predetermined temperature differential relative to a temperature of the rotor cooling air at a predetermined location;
wherein the first heat exchanger is upstream from the secondary cooler and the first portion of vane carrier cooling air is used as a coolant in the first heat exchanger to cool the second portion of vane carrier cooling air within the first heat exchanger before the second portion of vane carrier cooling air enters the secondary cooler.

8. The vane carrier temperature control system of claim 7, further comprising a pair of bypass circuits including respective valves for selectively allowing the first and second portions of vane carrier cooling air to bypass the first heat exchanger.

9. The vane carrier temperature control system of claim 7, wherein the first heat exchanger is configured such that the temperatures of the first and second portions of vane carrier cooling air are each within about 25° C. of the temperature of the rotor cooling air at axial locations corresponding to where the respective first and second portions of vane carrier cooling air are supplied to the vane carrier.

10. A method for operating a gas turbine engine that includes a compressor section including a plurality of compressor stages, a combustion section, a turbine section including a plurality of turbine stages, and a rotatable rotor, the method comprising:
supplying rotor cooling air to the rotor;
supplying a first portion of vane carrier cooling air extracted from an upstream section of the compressor section with reference to a direction of compressed air flow through the compressor section to a downstream section of a vane carrier with respect to an axial direction defined by a direction of hot working gas flow through the turbine section, the vane carrier supporting a plurality of rows of vanes within the turbine section;
supplying a second portion of vane carrier cooling air extracted from a downstream section of the compressor section with respect to the direction of compressed air flow through the compressor section to an axially upstream section of the vane carrier; and
controlling a temperature of the second portion of vane carrier cooling air in a heat exchanger assembly having a first heat exchanger and a secondary cooler, the secondary cooler using fuel that is to be supplied to combustors in the combustion section as a coolant such that the second portion of vane carrier cooling air is within a predetermined temperature differential relative to a temperature of the rotor cooling air at a predetermined location;
wherein the first heat exchanger is upstream from the secondary cooler and the first portion of vane carrier cooling air is used as a coolant in the first heat exchanger to cool the second portion of vane carrier cooling air within the first heat exchanger before the second portion of vane carrier cooling air enters the secondary cooler.

11. The method of claim 10, further comprising supplying a third portion of vane carrier cooling air extracted from an intermediate section of the compressor section with respect to the direction of compressed air flow through the compressor section to an axially intermediate section of the vane carrier.

12. The method of claim 10, further comprising providing a pair of bypass circuits to selectively allow the first and second portions of vane carrier cooling air to bypass the heat exchanger under select operating conditions.

13. The method of claim 10, further controlling the temperature of the first and second portions of vane carrier cooling air in the first heat exchanger such that each is within about 25° C. of the temperature of the rotor cooling air at axial locations corresponding to where the respective portions of vane carrier cooling air are supplied to the vane carrier.

14. The vane carrier temperature control system of claim 7, wherein the secondary cooler is used to cool the second portion of vane carrier cooling air to a desired temperature if the first portion of vane carrier cooling air does not have the capacity to cool the second portion of vane carrier cooling air in the first heat exchanger all the way down to the desired temperature without the first portion of vane carrier cooling air being heated above a preferred temperature.

15. The method of claim 10, wherein the first heat exchanger is upstream from the secondary cooler and the secondary cooler is used to cool the second portion of vane carrier cooling air to a desired temperature if the first portion of vane carrier cooling air does not have the capacity to cool the second portion of vane carrier cooling air in the first heat exchanger all the way down to the desired temperature without the first portion of vane carrier cooling air being heated above a preferred temperature.

* * * * *